United States Patent
Knoll et al.

(10) Patent No.: US 6,238,098 B1
(45) Date of Patent: May 29, 2001

(54) ROLLER BEARING CAGE

(75) Inventors: Wolfgang Knoll, Schorndorf; Wolfgang Ortmann, Halle, both of (DE)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/469,481

(22) Filed: Dec. 22, 1999

(30) Foreign Application Priority Data

Dec. 29, 1998 (DE) .............................................. 198 60 688

(51) Int. Cl.⁷ ...................................................... F16C 33/48
(52) U.S. Cl. .............................................................. 384/572
(58) Field of Search ................................... 384/572, 575, 384/576, 577, 580

(56) References Cited

U.S. PATENT DOCUMENTS 5,391,005 * 2/1995 Alling .................................... 384/575

* cited by examiner

*Primary Examiner*—Dirk Wright
(74) *Attorney, Agent, or Firm*—John C. Bigler

(57) ABSTRACT

A roller bearing cage has cage rims (1,3) on both of its axial ends. One cage rim (1) has a circumferential inside groove (5). The other cage rim (3) carries at least one holding lug (7) that protrudes radially. The holding lug (7) interlocks into the corresponding groove (5) of another such cage, wherein roller bearing cages with two or more rows are formed as a construction unit, which can rotate relative to one another.

10 Claims, 1 Drawing Sheet

ROLLER BEARING CAGE

BACKGROUND OF THE INVENTION

Figure 1:
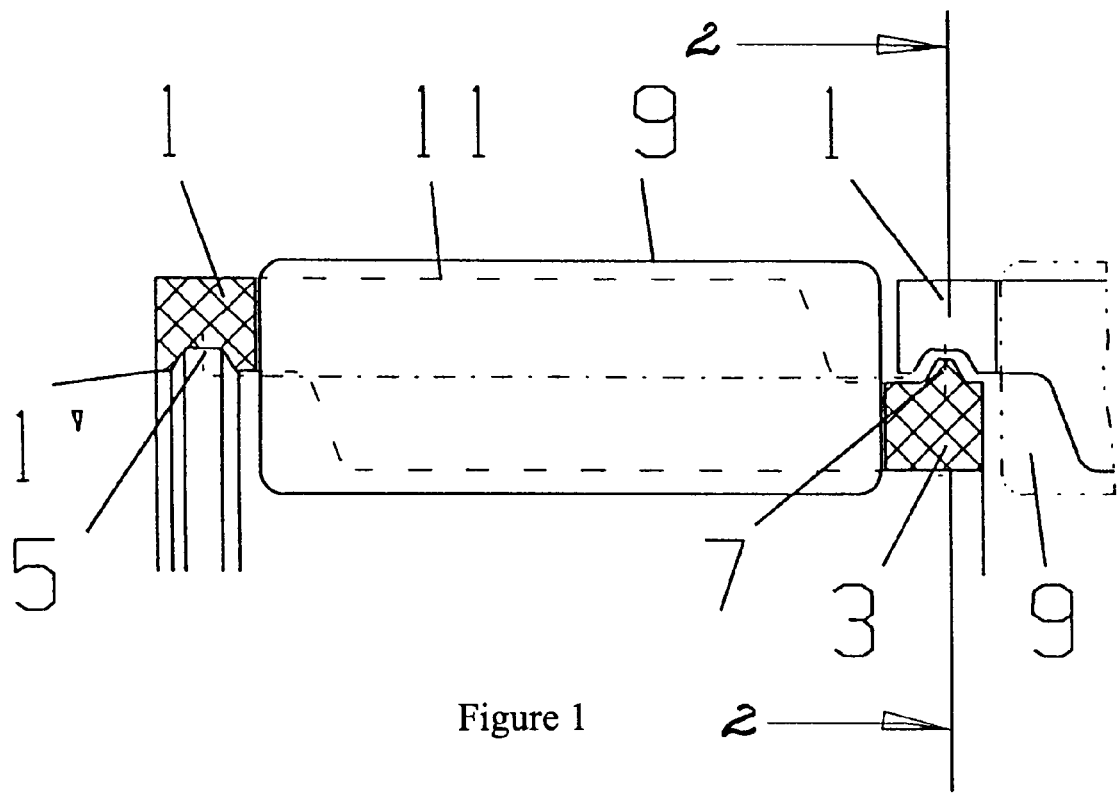

This invention relates generally to a roller bearing cage, and, more particularly, to a roller bearing cage used to hold needle rollers. Such bearing rings are used, for example, for motor vehicle gears.

A way to construct roller bearing cages in two or more rows is known—that is, to arrange axially, behind one another, two or more rows of roller bodies in a single cage. With such a one-part cage, different relative rotational speeds of the individual roller body rows, with respect to one another, are not possible during operation. Under unfavorable operating conditions, constraining forces on the cage arise in this way, which can lead to a rapid wear of the roller bearing and its surroundings or even to a blocking.

In order to avoid this, two or more separate one-row roller bearing cages have been installed axially, next to one another. Depending on the application case, these one-row cages have been packed in pairs, that is, by two, or in accordance with the number of the individual roller body rows per bearing site, several units together. The process-reliable assembly of two or more one-row roller bearing cages, axially, next to one another, for example in the loose wheel of a motor vehicle gear, requires a high additional testing expenditure. If, for example, only one cage, instead of several, is installed by mistake, this error leads to a failure of the roller bearing and the corresponding mechanism.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a roller bearing cage comprising cage rims (1,3) arranged on its two axial ends. The first cage rim (1) on the first axial end is provided with a circumferential, radially directed groove (5), and the second cage rim (3) on the second axial end is provided with at least one radially protruding holding lug (7) that can be positioned into the groove (5) of the cage rim (1) on the first axial end of another such cage to interlock the two cages together.

The foregoing and other aspects will become apparent from the following detailed description of the invention when considered in conjunction with the accompanying drawing figures.

BRIEF DESCRIPTION OF THE DRAWING FIGURES

Figure 2:
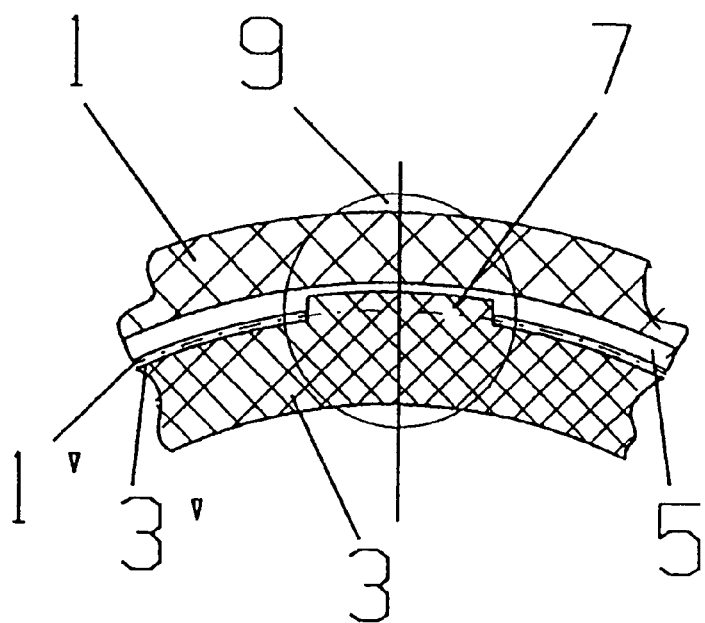

FIG. 1 shows an axial section through a roller bearing cage and a portion of a second roller bearing cage mutually interlocked together; and FIG. 2 shows a partial radial section of the two roller bearing cages of FIG. 1, as indicated by the line 2—2 of FIG. 1.

DETAILED DESCRIPTION

The invention is meant to make possible, on the one hand, different relative rotational speeds of individual rows of a roller bearing in a multi-row arrangement of roller bearing cages and, on the other hand, to ensure that the needed number of individual roller bearing cages is always installed, so as to form several rows of roller body rings, needed at the corresponding bearing site.

According to the invention, the two axial ends or rims of each roller bearing cage are constructed differently in such a way that a holding lug on one axial cage end can snap into a circumferential groove on another cage end of a second roller bearing cage. Two or more roller bearing cages are thereby connected with one another, in an interlocking manner, by mutually snapping into one another in an axial direction.

By fitting together two or more such roller bearing cages, construction units with two or more corresponding roller body rings can thus be formed. Because of their mutual rotating capacities during operation, this makes possible different relative rotational speeds of the individual roller body rings, connected with one another. Under certain particularly extreme operating conditions, this is required or advantageous for a satisfactory functioning of the bearing for kinematic reasons.

The expensive packing of individual roller bearing cages can be dispensed with since the bearing cages or roller body rings can be preassembled as sets of several units, for example in pairs, and can be packed together. At the same time, this feature makes possible a process-reliable assembly of two or more rows of roller body rings since they can be delivered, preassembled, in accordance with the installation conditions. Thus, the danger that, instead of two or more individual bearing cages, only one single bearing cage is installed, no longer exists, whereby the previously needed testing expenditure can be omitted. The embodiment of the roller bearing cage, in accordance with the invention, thus results in a cost savings for the packing and assembly.

Referring now to the drawings, each roller bearing cage has a first axial cage end rim 1 and a second radial cage end rim 3. The cage end rim 1 has an inside diameter that is slightly larger than the outside diameter of the cage rim 3, so that several roller bearing cages can be arranged axially, one behind the other, wherein the cage rim 1 is, in a radial direction, outside and above the cage rim 3. This arrangement can also be reversed so that the cage rim 1 would then be radially within the cage rim 3.

In the depicted exemplified embodiment, the cage rim 1 on the first axial end of the roller bearing cage is provided with a radially circumferential inside groove 5. The other cage rim 3 on the second axial end of the roller bearing cage is provided with holder lugs 7, which radially protrude toward the outside. They can be snapped into inside groove 5 of a cage rim 1 on the first axial end of a second cage, as is shown in FIG. 1. In this snapped-in state, the two roller bearing cages can be rotated relative to one another. Thus, the roll bodies 9, which are placed in the individual roller bearing cages and which can be designed as needle rollers, rotate at speeds that may be different from those of the adjacent roller bearing cage.

In order to make possible the snapping together of adjacent roller bearing cages and thus to set up an interlocking axial connection between the adjacent roller bearing cages, the outside diameter of the holding lugs 7 is somewhat larger than the inside diameter 1' of the first cage end or the first cage rim 1. In a corresponding manner, the outside diameter 3' of the second cage end or the second cage rim 3, which carries the holding lugs 7, is somewhat smaller than the inside diameter 1' of the first cage rim 1.

In order to make possible the mutual relative rotatability of adjacent roller bearing cages, there is a small radial play between the inside groove 5 of the first cage rim 1 and the holding lugs 7 of the second cage rim 3 in the state in which they are snapped together. As FIG. 1 also shows, the axial width of the holding lugs 7 is somewhat smaller than the axial width of the groove 5, wherein the snapping together of adjacent roller bearing cages is also facilitated, and, in particular, a certain axial play is made possible, which also contributes to the improvement of the relative rotatability between adjacent cages.

Finally, FIG. 1 shows that the holding lugs 7 and/or the inside groove 5 can converge from the inside to the outside in a radial direction. In this way, the snapping together and, if necessary, the separation of adjacent roller bearing cages are facilitated, since the inclined surfaces thereby formed serve as guide surfaces or slide surfaces for the adjacent parts of the cage rims 1,3.

In the aforementioned radially reversed arrangement of the cage rims 1 and 3, the developments described in the preceding description for the indicated exemplified embodiment can also be correspondingly reversed or adapted.

Advantageously, at least three, but in particular four holding lugs 7 are uniformly distributed over the circumference of the cage rim 3 so that, on the one hand, an easy snapping together of the adjacent cages is possible but, on the other hand, there is also a reliable cohesion of the adjacent cages in the axial direction.

Although the roller bearing cage can be made of metal, it is advantageous to produce the cage from plastic, in particular from a polyamide. Such materials have the elasticity required for the snapping together of the cages. The roller bodies or needle rollers 9 are made of roller bearing steel. As is common with roller bearing cages, the individual roller bodies 9 are separated from one another and conducted by axial connections 11 that extend in an axial direction between the cage rims 1 and 3.

Having described the invention, what is claimed is:

1. A roller bearing cage comprising cage rims (1,3) arranged on its two axial ends, wherein the first cage rim (1) on the first axial end is provided with a circumferential, radially directed groove (5), and the second cage rim (3) on the second axial end is provided with at least one radially protruding holding lug (7) that can be positioned into the groove (5) of the cage rim (1) on the first axial end of another such cage to interlock the two cages together.

2. A roller bearing cage according to claim 1, wherein, in the interlocked state, the two cages can rotate relative to one another.

3. A roller bearing cage according to claim 1, wherein the first cage rim (1) is radially outside the second cage rim (3) and wherein the groove (5) in the first cage rim (1) and the holding projection lug (7) on the second cage rim (3) are directed radially to the outside.

4. A roller bearing cage according to claim 3, wherein the outside diameter of the holding lug (7) is somewhat larger than the inside diameter (1') of the first cage rim (1).

5. A roller bearing cage according to claim 3, wherein the outside diameter (3') of the second cage rim (3), which carries the holding lug (7), is somewhat smaller than the inside diameter (1') of the first cage rim (1).

6. A roller bearing cage according to claim 1, wherein, in the interlocked state of two cages, there is a slight radial play between the groove (5) of the first cage rim (1) and the holding lug (7) of the second cage rim (3).

7. A roller bearing cage according to claim 1, wherein the axial width of the holding lug (7) is somewhat smaller than the axial width of the groove (5).

8. A roller bearing cage according to claim 1, wherein the holding lug (7) and/or the groove (5) converge in a radial direction with respect to the bottom of the groove.

9. A roller bearing cage according to claim 1, wherein the number of holding lugs (7) is at least three, and the holding lugs (7) are uniformly distributed over the circumference of the second cage rim (3).

10. A roller bearing cage according to claim 1, wherein the cage is made of plastic, in particular a polyamide.

* * * * *